United States Patent [19]

Horn et al.

[11] Patent Number: 4,617,225
[45] Date of Patent: Oct. 14, 1986

[54] SHEET-LIKE REINFORCED MATERIAL

[75] Inventors: Peter Horn, Heidelberg; Edwin Baumann, Schifferstadt; Matthias Marx, Bad Duerkheim; Peter Gerarts, Ostercappeln, all of Fed. Rep. of Germany

[73] Assignee: BASF Aktiengesellschaft, Ludwigshafen, Fed. Rep. of Germany

[21] Appl. No.: 791,113

[22] Filed: Oct. 24, 1985

[30] Foreign Application Priority Data

Oct. 27, 1984 [DE] Fed. Rep. of Germany ....... 3439461

[51] Int. Cl.$^4$ .......................... B32B 3/26; B32B 5/18; B32B 7/04; B32B 27/04
[52] U.S. Cl. .................... 428/215; 428/246; 428/284; 428/285; 428/306.6; 428/316.6; 428/319.3
[58] Field of Search ............... 428/304.4, 306.6, 307.3, 428/308.4, 309.9, 317.1, 317.5, 317.7, 320.2, 322.7, 473.5, 474.4, 474.7, 474.9, 477.4, 215, 396, 246, 319.3, 284, 319.7, 285, 287, 316.6

[56] References Cited

U.S. PATENT DOCUMENTS

| | | | |
|---|---|---|---|
| 3,849,154 | 11/1974 | Michael et al. | 428/396 |
| 4,043,950 | 8/1977 | Wilmsen et al. | 428/319.1 |
| 4,233,357 | 11/1980 | Taylor et al. | 428/314.4 |

FOREIGN PATENT DOCUMENTS 2701431  7/1977  Fed. Rep. of Germany ... 428/319.7

Primary Examiner—William J. Van Balen
Attorney, Agent, or Firm—Keil & Weinkauf

[57] ABSTRACT

Sheet-like reinforced materials consisting of
A. a core layer comprising a sheet-like textile structure, preferably a glass fiber mat,
B. a plastic matrix composed of a nylon which has been polymerized under alkaline conditions and penetrates both the core layer and the surface layer of layers, are produced batchwise by the RIM method or continuously on a double-belt press by impregnating the sheet-line textile structure and the foam sheets with a lactam melt and polymerizing the latter. The reinforced material can be used for the production of finished articles having a satisfactory surface, for example for the automotive or aircraft industry.

6 Claims, No Drawings

SHEET-LIKE REINFORCED MATERIAL

The present invention relates to a sheet-like reinforced material which consists of a nylon polymerized under alkaline conditions and is reinforced with a sheet-like textile structure.

It is known that fiber-reinforced nylon materials can be produced by activated alkaline polymerization of a lactam in the presence of glass fiber mats. It is possible to employ a batchwise procedure based on RIM technology, in which the mats are placed in a mold and the lactam melt is injected and polymerized (DE-A No. 28 17 778 and DE-A No. 33 25 554), or a continuous procedure in which glass mats are combined with the lactam melt and pressed, these operations being carried out on a double-belt press. In both cases, sheet-like moldings possessing excellent mechanical and thermal properties are obtained. However, their surface is not completely satisfactory since the glass fibers approach the surface so closely that it exhibits a certain degree of roughness.

It is an object of the present invention to provide a sheet-like reinforced material which is based on nylon polymerized under alkaline conditions and reinforced with a sheet-like textile structure and which possesses a smooth, fiber-free surface.

We have found that this object is achieved, in accordance with the invention, by incorporating into the reinforced material one or more surface layers consisting of an open-cell aminoplast or phenoplast foam.

The present invention accordingly relates to a sheet-like reinforced material consisting of
A. a core layer comprising a sheet-like textile structure,
B. one or more surface layers comprising an open-cell aminoplast or phenoplast foam and
C. a plastic matrix which is composed of nylon polymerized under alkaline conditions and penetrates both the core layer and the surface layer or layers.

That the liquid lactam would completely penetrate the very fine-cell aminoplast or phenoplast foam to form a bubble-free nylon matrix during polymerization was not directly to be expected. When polyurethane foams, which are likewise open-cell foams, are used, satisfactory reinforced materials are not obtained.

The core layer A consists of a sheet-like textile structure, which may be a mat, a web, a fabric or a felt. The fibers may consist of glass, carbon, aromatic nylon, polyethylene terephthalate, polybutylene terephthalate or a natural material, such as cotton. Glass mats having a weight per unit area of from 150 to 1200 g/m$^2$ are preferred. The mats can be consolidated mechanically in a conventional manner by needle-punching or may be bound by means of a conventional binder, e.g. a polyurethane. The fibers preferably have a diameter of from 7 to 20 μm and are advantageously provided with conventional sizes which do not interfere with the polymerization, such sizes being described in, for example, U.S. Pat. No. 4,358,502. The core layer is preferably from 0.1 to 20, particular from 1 to 10, mm thick.

The novel sheet-like reinforced materials preferably have surface layers B on both sides. These layers B consist of an aminoplast or phenoplast foam. It is essential that these foams be open-cell foams so that they can be penetrated by the lactam melt. Preferred foams are resilient ones, as described in EP-A Nos. 17 672, 31 513 and 49 768. Their density is from 3 to 300, preferably from 5 to 100, g/l. The surface layer or layers are preferably from 0.1 to 10, in particular from 1 to 5, mm thick.

Both the core layer and the surface layer or layers are penetrated by a plastic matrix C consisting of nylon polymerized under alkaline conditions.

The preparation of nylon moldings by activated alkaline lactam polymerization is known, and is described in detail in, for example, Kunststoff-Handbuch, volume VI, Polyamide, Carl-Hanser-Verlag 1966, pages 46–49. The process starts from two components, one component being a catalyst-containing lactam melt and the other an activator-containing lactam melt. The two components are mixed, transported into a mold and polymerized there.

A preferred lactam is ε-caprolactam, but pyrrolidone, caprylolactam, laurolactam, enantholactam and a corresponding C-substituted lactam may also be employed. The lactams may furthermore be modified, for example with polyetherols, isocyanate prepolymers or bisacyllactams. From 99 to 30, or preferably from 90 to 40, %, based on the weight of the ready-prepared reinforced material, of lactam are employed.

Examples of suitable catalysts are alkali metal and alkaline earth metal compounds of lactams, such as sodium ε-caprolactamate, or of short-chain aliphatic carboxylic acids, such as sodium formate or potassium formate, or of alcohols of 1 to 6 carbon atoms, such as sodium methylate or potassium tert.-butylate. Alkali metal and alkaline earth metal hydrides, hydroxides and carbonates, and Grignard compounds, may also be used. The catalysts are usually employed in amounts of from 0.1 to 10 mol %, based on total lactam.

Suitable activators are N-acyllactams, such as N-acetylcaprolactam, bisacyllactams, substituted triazines, carbodiimides, ketenes, cyanamides, mono- and polyisocyanates and masked isocyanate compounds. They are preferably used in amounts of from 0.1 to 10 mol %.

The impact strength of the molding materials can be increased by means of conventional additives, such as polyalkylene glycols having molecular weights of from 2000 to 100,000, or by adding reactive or unreactive rubbers, for example graft polymers.

The polymerization of the lactam can be carried out in the presence of a conventional stabilizer. A combination of CuI and KI in a molar ratio of 1:3 is particularly advantageous, this combination being added to the activator-containing component B in an amount corresponding to 50–100 ppm, based on total lactam, of copper. Other suitable stabilizers are cryptophenols and amines.

Further additives are inorganic fillers which do not interfere with the polymerization, e.g. metal powders, quartz powder, metal oxides, graphite, carbon black, silica gel, pigments, wollastonite and chalk, the said fillers being used in amounts from 1 to 60% by weight, based on the molding. Light stabilizers, optical brighteners, flameproofing agents, crystallization accelerators, e.g. talc or nylon 22, lubricants, such as molybdenum sulfide, and substances which reduce shrinkage may also be added.

It is also advantageous to add from 0.05 to 2% by weight of internal release agents, for example calcium stearate, sodium stearate, potassium stearate, stearyl stearate or octadecyl alcohol.

The batchwise process corresponds to a modified reaction injection molding (RIM) technique, which has been described for polyurethanes, for example by Piechota and Röhr in Integralschaumstoffe, Carl-Hanser-Verlag 1975, pages 34–37.

The two lactam components are heated separately in kettles to above the melting point of the lactam, preferably to 80°–140° C. The components are conveyed by means of hydraulically driven, heated plunger pumps through heated pipes to a mixing head which is likewise heated. For injection into the mold, the plunger of the mixing head is drawn back and the two exactly metered components enter the open mixing chamber, are mixed thoroughly there and are forced into the mold connected by a flanged connection. This is carried out in general under a pressure of greater than 1, preferably from 1.1 to 300, in particular from 2 to 30, bar. The lactam melt is transferred completely from the mixing head into the mold in the course of from 2 to 50, preferably from 3 to 20, sec. The mold need not be flushed with nitrogen. In principle, however, it is also possible to employ atmospheric pressure, using the casting method.

The mold is advantageously preheated to 120°–180° C., preferably 125°–160° C. Since the foam sheets and the sheet-like textile structure are introduced into the mold beforehand, the two are at the temperature of the mold. The lactam melt warms up rapidly in the mold, reaching the temperature of the latter, and polymerizes in the course of less than 3 minutes. Advantageously, the pressure is maintained for a few seconds after the mold has been filled. In general, the ready-prepared molding can be removed from the mold after as short a time as 1–2 minutes. At a polymerization temperature of from 120°–180° C., a high molecular weight nylon having a K value (according to Fikentscher, Cellulosechemie 13, page 58) of more than 100, preferably from 110 to 160, and containing less than 3%, preferably less than 2%, of monomers and oligomers is formed. The K value can be controlled by adding known regulators, for example long-chain aliphatic monoamines, such as stearylamine, or crosslinking agents, e.g. methylenebiscaprolactam.

The continuous process is carried out in principle in a similar manner. One or more foam sheets which have been laid on a base, e.g. aluminum foil, are combined with the sheet-like textile structure on a double-belt press. The resulting combination is impregnated with the lactam melt containing a catalyst and an activator, and polymerization is effected at from 120° to 180° C., preferably from 125° to 160° C., under from 1 to 200, preferably from 5 to 150, bar.

This process can be used to produce large sheet-like moldings, for example sheets from 0.2 to 40 mm thick. This sheeting can be further processed to finished articles by pressing at above the melting point of the nylon.

The moldings produced by the novel process possess good mechanical strength and a satisfactory, fiber-free surface. They are particularly useful as moldings for the automotive and aircraft industries, for example for bodywork components, such as fenders and doors, as well as for industrial housings and for the production of sandwich components.

In the Example, percentages are by weight.

EXAMPLE

Formulation for Component I 42 g of caprolactam and
8.0 g of a 17.5% strength solution of sodium lactamate in caprolactam.

Formulation for Component II 41.25 g of caprolactam and
8.5 g of a solution of 83.5% of caprolactam and 16.5% of hexamethylene diisocyanate.

Component I was preheated to 120° C., and component II to 110° C. The components were mixed, in a ratio of 1:1, in a self-purging mixing head with a plunger, manufactured by Elastogran Maschinenbau, Strasslach.

Two 2.5 mm thick melamine resin foam sheets having a density of 12 g/l and, between these, a 2.5 mm thick glass mat having a weight per unit area of 600 g.m$^{-2}$ were introduced, without fixing, into the mold cavity, which was a steel mold having internal dimensions of 640×240×4 mm. The mold together with the foam sheets and the glass mat was preheated to 150° C. The mixture was transferred from the mixing head into the mold under 10 bar and in the course of 7 sec. A surface pressure of 150 kN/m$^2$ was maintained for 20 seconds after the injection shot was complete. After 1.5 minutes, the mold was opened and the ready-prepared molding was removed. It had a glass fiber content of 12.5% and a K value of 130 and possessed an extremely smooth, fiber-free surface.

We claim:
1. A sheet-like reinforced material consisting of
   A. a core layer comprising a sheet-like textile structure,
   B. one or more surface layers comprising an open-cell aminoplast or phenoplast foam and
   C. a plastic matrix which is composed of nylon polymerized under alkaline conditions and penetrates both the core layer and the surface layer or layers.
2. A sheet-like reinforced material as claimed in claim 1, wherein the core layer is from 0.1 to 20 mm thick and the surface layer is from 0.1 to 10 mm thick.
3. A sheet-like reinforcing material as defined in claim 1, wherein the core layer is from 1 to 10 mm thick and the surface layer is from 1 to 5 mm thick.
4. A sheet-like reinforcing material as defined in claim 1, wherein the core layer A is a glass mat having a weight per unit area of from 150 to 1200 g/m$^2$.
5. A sheet-like reinforcing material as defined in claim 4, wherein the surface layer or layers B have a density of from 3 to 300 g/l.
6. A sheet-like reinforcing material as defined in claim 5, wherein the surface layer or layers B have a density of from 5 to 100 g/l.

* * * * *